US009879806B2

(12) United States Patent
Scherer et al.

(10) Patent No.: US 9,879,806 B2
(45) Date of Patent: Jan. 30, 2018

(54) DEVICE AND METHOD FOR CONNECTING A HYDRAULIC HOSE TO A CONNECTING NIPPLE

(75) Inventors: Eric Scherer, Otigheim (DE); Frank Wilczek, Hannover (DE)

(73) Assignee: Eaton Industrial IP GMBH & CO. KG, Schonefeld (DE)

( * ) Notice: Subject to any disclaimer, the term of this patent is extended or adjusted under 35 U.S.C. 154(b) by 1918 days.

(21) Appl. No.: 12/063,541

(22) PCT Filed: Aug. 8, 2006

(86) PCT No.: PCT/EP2006/007833
§ 371 (c)(1),
(2), (4) Date: May 14, 2010

(87) PCT Pub. No.: WO2007/019989
PCT Pub. Date: Feb. 22, 2007

(65) Prior Publication Data
US 2011/0031742 A1    Feb. 10, 2011

(30) Foreign Application Priority Data
Aug. 13, 2005   (DE) .................. 10 2005 038 476

(51) Int. Cl.
*F16L 33/20* (2006.01)
*F16L 33/207* (2006.01)
*F16L 33/18* (2006.01)

(52) U.S. Cl.
CPC .......... *F16L 33/2076* (2013.01); *F16L 33/18* (2013.01)

(58) Field of Classification Search
USPC ........... 285/242, 256, 222.1–222.5, 239, 925
See application file for complete search history.

(56) References Cited

U.S. PATENT DOCUMENTS 2,264,815 A * 12/1941 Thomson ..................... 285/239
2,453,997 A * 11/1948 MacWilliam ................ 285/256
(Continued)

FOREIGN PATENT DOCUMENTS

| DE | 8813089 U1 | 1/1989 |
| DE | 10010573 C1 | 3/2001 |
| GB | 2273537 A | 6/1994 |

OTHER PUBLICATIONS

European Patent Office, International Search Report and Written Opinion issued in counterpart PCT application No. PCT/EP2006/007833; dated Jan. 2, 2007.
(Continued)

*Primary Examiner* — Aaron Dunwoody
*Assistant Examiner* — Fannie Kee
(74) *Attorney, Agent, or Firm* — Fishman Stewart PLLC

(57) ABSTRACT

A hydraulic connection includes a connecting nipple, preferably of steel or of another metal, whereby, on the nipple's tube-shaped extension, a hydraulic hose is held by compression by means of a fitting. A swelling element is arranged between the extension and the hydraulic hose, the element being swellable in the hydraulic fluid. If hydraulic fluid were to advance through to the swelling element, the element will swell and block the path to more hydraulic fluid. Furthermore, by swelling, the element deforms the hydraulic hose in a radially outward direction. In this region, the hydraulic hose is held by a fitting in the form of a metal sleeve so that the hose may not be displaced. In this manner, the force of pressure on the hydraulic hose is increased in an annular zone.

17 Claims, 3 Drawing Sheets

(56) References Cited

U.S. PATENT DOCUMENTS

| | | | |
|---|---|---|---|
| 3,154,329 A | | 10/1964 | Skinner |
| 3,578,360 A | * | 5/1971 | Eliot ............................. 285/55 |
| 4,039,212 A | * | 8/1977 | Skarud ........................ 285/253 |
| 4,522,435 A | | 6/1985 | Miller et al. |
| 5,014,423 A | | 5/1991 | Raghavan |
| 5,044,671 A | * | 9/1991 | Chisnell et al. ................ 285/55 |
| 5,261,706 A | * | 11/1993 | Bartholomew ............... 285/242 |
| 5,653,475 A | * | 8/1997 | Scheyhing et al. ............ 285/54 |
| 5,879,033 A | * | 3/1999 | Hansel et al. ................. 285/239 |
| 6,010,162 A | | 1/2000 | Grau et al. |
| 6,450,549 B1 | * | 9/2002 | Schutz ......................... 285/256 |
| 6,688,653 B1 | * | 2/2004 | Thrift et al. ............. 285/148.13 |
| 6,764,593 B1 | | 7/2004 | Pace |
| 7,090,255 B2 | | 8/2006 | Clarke et al. |
| 7,806,442 B2 | | 10/2010 | Baxi et al. |
| 2004/0032124 A1 | * | 2/2004 | Lefere et al. ................. 285/242 |
| 2005/0029811 A1 | * | 2/2005 | Thorensen .................... 285/382 |
| 2005/0127672 A1 | * | 6/2005 | Ellington .............. E21B 43/106 |
| | | | 285/382 |
| 2005/0285392 A1 | | 12/2005 | Brauckmiller et al. |
| 2008/0252072 A1 | | 10/2008 | Scherer et al. |
| 2010/0207387 A1 | | 8/2010 | Stroempl et al. |

OTHER PUBLICATIONS

International Bureau of WIPO on behalf of the European Patent Office; International Preliminary Report on Patentability/Written Opinion dated Jan. 2, 2007 in counterpart PCT application No. PCT/EP2006/007833; dated Feb. 26, 2008.
European Patent Office, European Search Report issued in counterpart European application No. 06776672.5; dated Jul. 4, 2011.

\* cited by examiner

DEVICE AND METHOD FOR CONNECTING A HYDRAULIC HOSE TO A CONNECTING NIPPLE

CROSS-REFERENCE TO RELATED APPLICATIONS

This application claims the benefit of International Application No. PCT/EP2006/007833, filed Aug. 8, 2006, which claims the benefit of German Application No. 102005038476.5 filed Aug. 13, 2005, both of which are fully incorporated herein by reference as though fully set forth herein.

BACKGROUND

The invention relates to a hydraulic hose connection and a connecting method therefor.

Hydraulic hose are used, for example, on earth-moving machines or other technical installations and systems for the transport of hydraulic oil or of other hydraulic fluids that are subject to high pressure. Hydraulic hose withstand this pressure and are flexible. In so doing, some problems are caused by the connection of such hydraulic hose to pumps, hydraulic motors or other such units. To establish such connections, the ends of the hydraulic hose are provided with connecting nipples consisting of steel, for example; said nipples can then be screwed or otherwise connected to the appropriate connections of the units that are to be connected. The connecting site between the connecting nipple and the hydraulic hose need not be permanent. To accomplish this, the connecting nipple, as a rule, comprises a tube-shaped extension extending a few centimeters in to the hydraulic hose, whereby the hydraulic hose is seated on said extension. For fastening, a fitting is pressed onto the outside of the hydraulic hose, said fitting clamping the hydraulic hose radially inward against the extension of the connecting nipple and being itself axially secured to said connecting nipple.

At very high operating pressures of, e.g., up to 400 bar, and four times the bursting pressure (1600 bar), it may occasionally happen that oil leaks occur on the connecting nipple. Due to repeated load variations and temperature influences the elastomeric material of the hydraulic hose may experience some settling, thus potentially allowing gaps to form.

It is the object of the invention to produce a permanently tight hydraulic hose connection.

This object is achieved with the hydraulic hose connection and with the connecting method.

BRIEF SUMMARY

The hydraulic hose connection in accordance with the invention comprises a connecting nipple which is designed to receive the hydraulic hose. Interposed between the connecting nipple and the hydraulic hose, there is at least one swelling element that is able to swell in the hydraulic fluid. Should a leak develop and thus allow hydraulic fluid to initially advance to the swelling element, said element's volume increases, so that it effectively blocks the opening gap. Consequently, the hydraulic connection remains sealed toward the outside even if aging influences resulting from load changes or temperature influences would cause a leak in similar arrangements and situations without swelling element. The escape of hydraulic fluid, e.g., hydraulic oil, is effectively prevented in this manner. Any other occasionally observed external hydraulic oil films and the resultant contamination do not occur.

Preferably, the swelling element is configured as a closed ring that is placed around the outside circumference of the connecting nipple. In so doing, the entire circumference of the connecting nipple is sealed. For example, an O-ring may be used as a the swelling element. Alternatively, the annular swelling element may have a different cross-section, e.g., a polygonal, e.g., tetragonal, cross-section. Preferably, said swelling element consists of an elastic material which facilitates the placement of said swelling element in a corresponding accommodation space, for example, having the configuration of an annular groove or an annular bead. The swelling element may consist of a suitable rubber, e.g., natural rubber, or of synthetic rubber, of an elastomer such as EP or EPDM. In any event, the material of the swelling element is selected in such a manner that it swells at least somewhat under the influence of the hydraulic fluid, i.e., its volume increases. Preferably, materials are selected that swell gradually. During swelling, the hydraulic fluid penetrates into the matrix of the swelling element. Preferably, the materials used for the swelling element are materials in which this process progresses gradually.

Preferably, the swelling element is arranged in a zone in which the surface of the hydraulic hose abuts against the connecting nipple. Consequently, the hydraulic fluid advancing through this gap is opposed by only a very small area on the side of the swelling element. On the pressureless side, the gap area approaches zero. Thus, the swelling element is substantially non-diffusible, even though hydraulic fluid may at least very gradually migrate through it.

The annular groove for the accommodation of the swelling element preferably has a cross-section that is adapted to the cross-section of the swelling element. In this manner, any increase in volume of the swelling element as a result of the occurring swelling is converted into increased pressure against the hydraulic hose. To do so, the swelling element, as it swells, preferably abuts directly and indirectly against the hydraulic hose and deforms said hose in a radially outward manner.

Preferably, a fitting configured as a sleeve extends around the hydraulic hose, in particular in the region of the swelling element, said sleeve preventing an outward displacement of the hydraulic hose. In this manner, a permanent seal is ensured, even if the material of the hydraulic hose displays significant aging.

Preferably, the swelling element is installed dry in the connecting nipple, i.e., in a state in which said element's volume is minimal. Consequently, any increase in volume caused by swelling is utilized to achieve a sealing effect. Preferably, a sealing element and, again, preferably a commercially available sealing element such as, for example, an O-ring is used. Preferably, the material of said sealing element is selected in such a manner that it is unresistant to the hydraulic fluid at least to the extent that it will at least swell under the influence of the hydraulic fluid. In so doing, however, it is also possible that the swelling element will at least dissolve partially. However, it is preferred that the material of the swelling element be selected in such a manner that the swelling element does not dissolve, but merely swells, under the influence of the hydraulic fluid. For example, considering the most frequently used hydraulic fluids, EPDM is suitable.

BRIEF DESCRIPTION OF THE SEVERAL VIEWS OF THE DRAWINGS

Additional details of advantageous embodiments of the invention result from the drawing, the description and the claims.

The drawings show an exemplary embodiment of the invention. They show in

DETAILED DESCRIPTION

Figure 1:
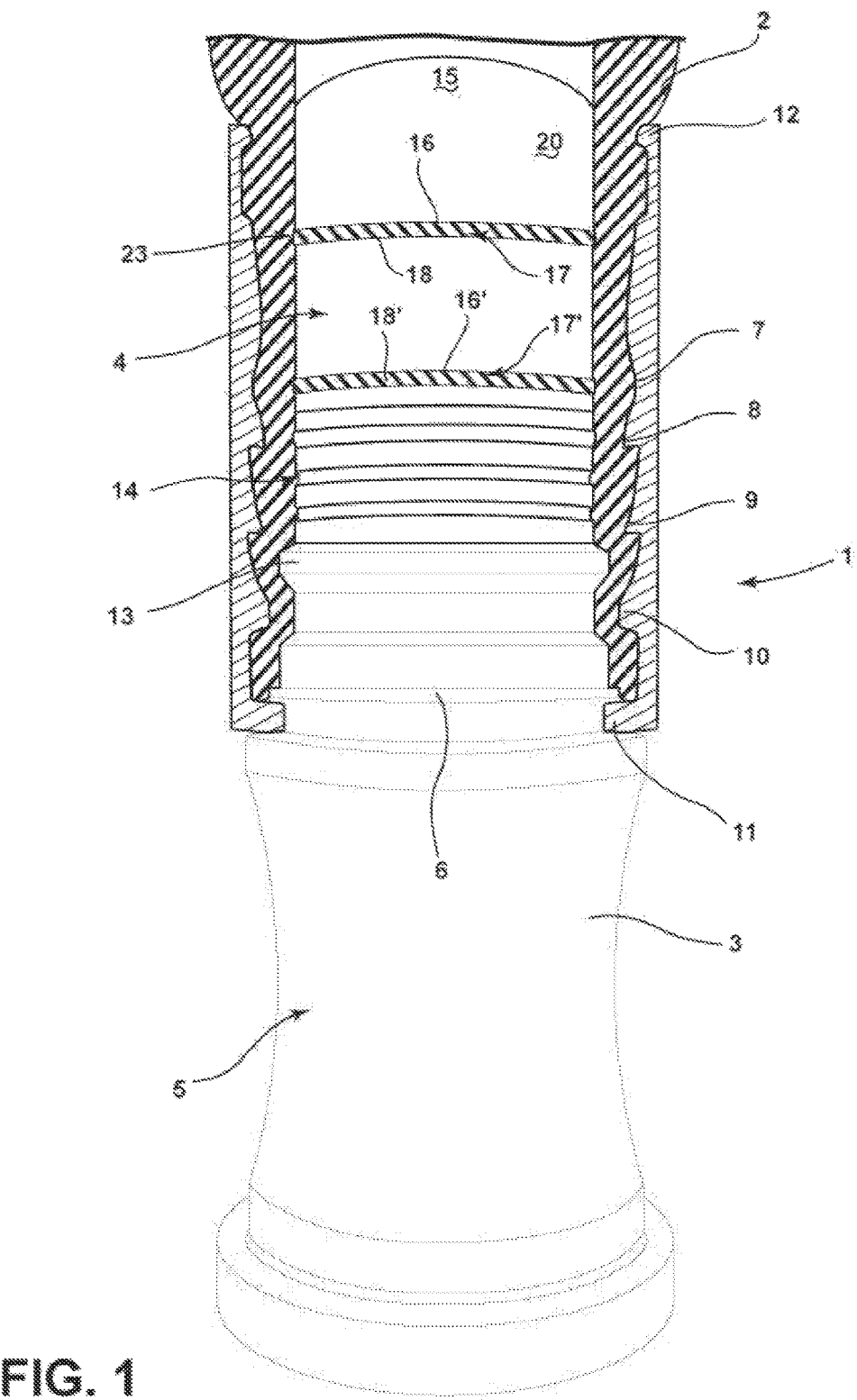
FIG. 1 a perspective view, partially in section, of a hydraulic connection.

FIG. 1 shows a hydraulic hose connection 1. This comprises a hydraulic hose 2, for example, configured as a flexible, fabric-reinforced, pressure-resistant elastomer hose. On its inside and on its outside, said hose has a smooth cylindrical wall when it is not deformed and is resistant to the hydraulic fluid transported in it. To achieve this, said hose consists either completely of appropriately resistant material or is at least lined therewith on its inside.

In order to hold the hose, a connecting nipple 3 comprising a tube-shaped extension 4 for the accommodation of the hydraulic hose 2 is provided. The extension 4 adjoins a receptacle 5 which can be configured as, or provided as, a plug connector or a screw connector having or being provided with a flange or the like, or which may be part of a larger unit, for example, a pump, a refrigerator, a damper or the like. An annular rib 6 adjoins the extension 4, said rib acting as a counter-bearing for holding a fitting 7 pressing the hydraulic hose 2 against the extension 4. The fitting 7 has the shape of a sleeve with an inside profile. For example, it has several retaining ribs 8, 9, 10 having a sawtooth-shaped cross-section. In addition, the fitting 7 has an inward-directed flange 11 that allows the fitting 7 to reach around the rib 6 in order to be supported in an axial direction. On its opposite end, the fitting 7 has another inward-directed rib 12 which presses the hydraulic hose 2 against the extension 4.

The extension 4 has an outside circumference which is provided with several annular profiled structures. The annular structures include, for example, an annular rib 13 that comes into engagement between the two holding ribs 9, 10. Additional annular grooves 14 being disposed to secure the hose in the axial direction may be provided on the essentially cylindrical outside surface, said annular grooves having a sawtooth-shaped profile, for example.

The extension 4 is preferably provided with an annular groove 16 in the vicinity of the free end 15 of said extension hose, a swelling element 17 being seated in said annular groove. This detail is specifically shown in longitudinal section in FIG. 2.

Figure 2:
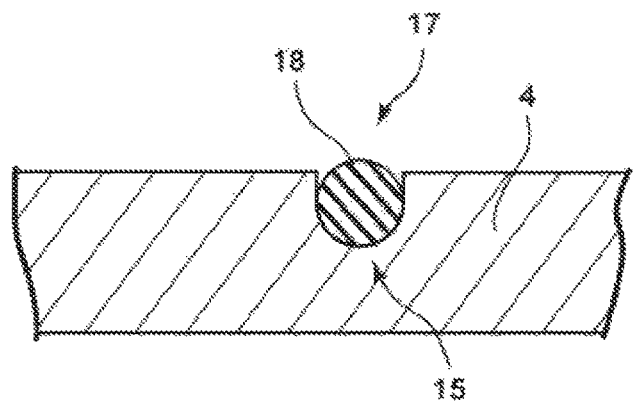
FIG. 2 a schematic view of a detail, in longitudinal section, of a connecting nipple with the swelling element.

FIG. 2 shows a detail of the wall of the tube-shaped extension 4. As is obvious, the annular groove 16 is provided with a round bottom, against which the swelling element 17 abuts in a manner so as to form almost no gap. For example, the annular groove 16 has straight groove flanks that terminate in a bottom that has a semi-circular configuration in longitudinal section. In so doing, the annular groove 16 has a depth such that the by-far-greatest portion of the swelling element 17 is accommodated by the annular groove 16, and that merely a small section of the swelling element 17 projects from the annular groove 16. The swelling element 17 in the present exemplary embodiment is an O-ring 18 that is otherwise used as a seal, said O-ring forming a seamless circular ring and having a body with a circular cross-section as is obvious from FIG. 2. The O-ring 18 is preferably made of EPDM, which is swellable in most hydraulic fluids that are being used. The O-ring 18 is elastic in swollen as well as in non-swollen state.

Figure 5:
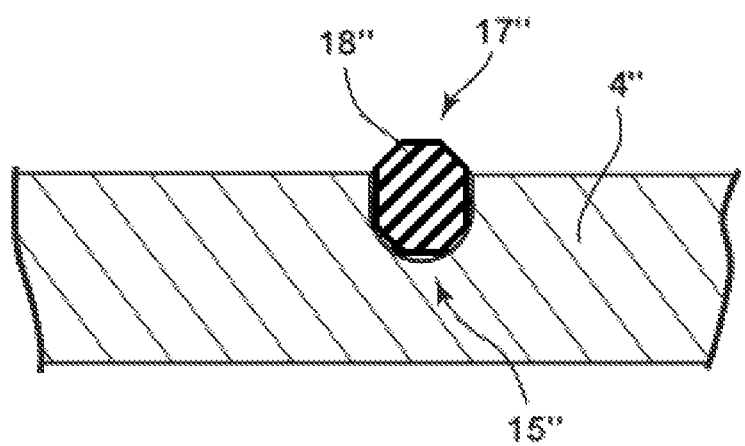
FIG. 5 is a view of a detail, in longitudinal section, of a connecting nipple with a swelling element having a polygonal cross-section.

Referring to FIG. 5, an embodiment of a swelling element 17" having a polygonal cross-section is generally illustrated.

Figure 3:
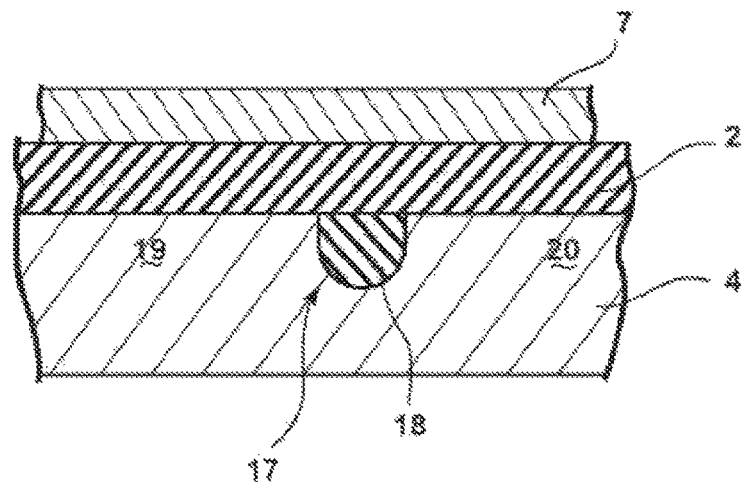
FIG. 3 a view of a detail, in longitudinal section, of the connecting nipple in accordance with FIG. 2 with attached hydraulic hose; and, FIG. 4 the arrangement in accordance with FIG. 3 with a partially swollen swelling element.

FIG. 3 shows the installed state of the hydraulic hose 2. The fitting 7 is firmly pressed against the extension 4, thus clamping the hydraulic hose 2 immovably in place. Due to the profiling of the extension 4 that is not specifically obvious from FIGS. 2 through 4, as well as due to the internal profile of the fitting 7, the hydraulic hose 2 is also secured in the axial direction. In so doing, the entire surface of the inside wall of the hydraulic hose 2 abuts against the extension 4. This applies to both sides 19, 20 of the O-ring 18 shown in FIG. 3. In other words, a joint exists on the side 20 above the O-ring 18 in FIG. 1, as well as on the side 19 below the O-ring in FIG. 1, whereby, considering said joint, a firm abutment exists between the hydraulic hose 2 and the extension 4. The joint 20 is normally tight so that no hydraulic fluid may advance through to the O-ring 18. Thus, as illustrated in FIG. 3, the ring 18 is seated, in non-swollen state, in the annular groove 16, on the one hand, and abuts against the internal wall of the hydraulic hose 2, on the other hand.

Figure 4:
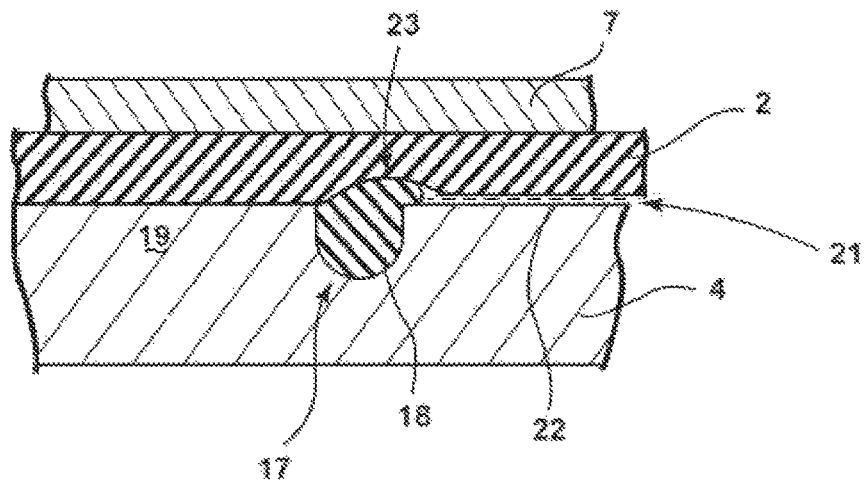

As a result of the operating pressure of, e.g., up to 400 bar, as a result of materials holders, material compositions or material shrinkage, as a result of temperature fluctuations and/or vibrations, however, it cannot be excluded that hydraulic fluid 21 penetrates into the gap 22 formed between the hydraulic hose 2 and the extension 4, as is obvious from FIG. 4. In this way, the hydraulic fluid 21 reaches at least the O-ring 18. Said O-ring preferably consists of EPDM or of another suitable material which will swell on contact with the hydraulic fluid 21. Preferably, a spatially cross-linkable material is used, whereby molecules of the hydraulic fluid 21 may be incorporated in said material's matrix, i.e., the hydraulic fluid 21 may dissolve in said O-ring's matrix. By incorporating molecules of the hydraulic fluid 21 in the matrix of the O-ring 18, said O-ring swells, i.e., its volume increases. On the one hand, this simply blocks the opening gap 22 and, on the other hand, as shown by FIG. 4, causes an additional compression of the outside of the hydraulic hose in a zone 23. While the fitting 7 exerts a radially inward pressure on the hydraulic hose 2 in order to clamp it against the extension 4, the swelling element 18 in the annular zone 23 exerts a radially outward pressure. Consequently, the gap 22 is effectively sealed. The seal continues to exist due to the swelling ability of the O-ring 18 even if the gap 22 were to enlarge. The swelling element 17 has dimensions that are such that its swellability exceeds any shrinkage or settling of the hydraulic hose material.

On its flank facing side 19, the O-ring 18 is in contact with a dividing joint between the hydraulic hose 2 and the extension 4, said joint not being open like a gap but rather having a radial expansion of zero. Therefore, the O-ring 18, even when its matrix is filled with hydraulic fluid, cannot release any hydraulic fluid to this gap. The swelling element 17 having the shape of the O-ring 18 thus acts as a seal against the hydraulic fluid 21, even though said swelling element consists of a material which in fact is not resistant to the hydraulic fluid 21.

As described, the connecting nipple 3 comprises at least one O-ring 18 displaying the above-described properties. However, it is preferred that at least one additional such O-ring 18' be provided, said O-ring being seated in an appropriate annular groove 16'. The thusly formed additional swelling element 17' may act to catch final leaks which the O-ring 16 might still allow to pass, and will still function if the O-ring 18 has been mechanically damaged. Likewise, the O-ring 18' consists of a material that is somewhat swellable in hydraulic fluid. Considering both O-rings 18, 18', however, the material must be selected in such a manner that said material can swell slightly, however, cannot not dissolve completely, in hydraulic fluid.

If needed, additional swellable O-rings or other appropriate, preferably closed annular, swelling elements may be provided, said elements being arranged at a certain distance from the O-rings 18, 18'. The swelling elements 17, 17' or the O-rings 18, 18', in so doing, are preferably arranged at a distance from each other in grooves having a form that has been adapted to that of the O-rings or miscellaneous swelling elements 17, 17'. Alternatively, it is also possible to accommodate several swelling elements 17, 17' in a common accommodation space, for example, in a common correspondingly wide groove. The modification as shown by FIG. 1 with separate and spaced-apart annular grooves 16, 16', however, is preferred. Other than that, the description provided for the swelling element 17 is analogously applicable to the swelling element 17'.

The presented hydraulic hose connection is permanently tight even at very high operating pressures and under adverse conditions of use such as pulsing loads, severe temperature fluctuations and heavy mechanical loads.

A hydraulic connection 1 comprises a connecting nipple, preferably of steel or of another metal, whereby, on said nipple's tube-shaped extension 4, a hydraulic hose 2 is held by compression by means of a fitting 7. A swelling element 17 is arranged between the extension 4 and the hydraulic hose 2, said element being swellable in the hydraulic fluid. If hydraulic fluid were to advance through to the swelling element, said element will swell and block the path to more hydraulic fluid. Furthermore, by swelling, said element deforms the hydraulic hose 2 in a radially outward direction. In this region, the hydraulic hose 2 is held by a fitting 7 in the form of a metal sleeve so that said hose may not be displaced. In this manner, the force of pressure on the hydraulic hose 2 is increased in an annular zone 23. A durable seal is achieved.

The invention claimed is:

1. A hose connection comprising:
a connecting nipple having an annular rib,
a hose attached to the connecting nipple,
at least one swelling element having a cross-section that is interposed between the connecting nipple and the hose, wherein a volume of the at least one swelling element increases in or on contact with a fluid, and
a fitting pressing at least a portion of the hose against the connecting nipple, the fitting having at least a first and a second retaining rib,
wherein the annular rib of the connecting nipple is disposed between the first and second retaining ribs of the fitting to secure the hose in an axial direction; the connecting nipple has an annular groove having a cross-section for the accommodation of the at least one swelling element; the cross-section of the at least one swelling element is equal to, or greater than, the cross-section of the annular groove;
wherein the at least one swelling element is seated in the annular groove; and, after contact with said fluid, the at least one swelling element swells to exert a pressure on the hose and deform the hose; and,
wherein the connecting nipple includes an extension, the at least one swelling element includes a first swelling element and a second swelling element, and the first swelling element is in contact with a dividing joint between the hose and the extension, the dividing joint including portions of the hose and the extension directly abutting each other.

2. The hose connection in accordance with claim 1, wherein an inside profile of the fitting has a saw-tooth-shaped cross-section.

3. The hose connection in accordance with claim 2, wherein the connecting nipple has an outside surface with a plurality of annular grooves disposed thereon to secure the hose in the axial direction.

4. The hose connection in accordance with claim 1, wherein the at least one swelling element is arranged so as to reach around the connecting nipple.

5. The hose connection in accordance with claim 1, wherein the at least one swelling element is an O-ring.

6. The hose connection in accordance with claim 1, wherein the cross section of the at least one swelling element is polygonal.

7. The hose connection in accordance with claim 1, wherein the at least one swelling element is formed of an elastomeric material.

8. The hose connection in accordance with claim 1, wherein the at least one swelling element includes a material nonresistant to the fluid.

9. The hose connection in accordance with claim 1, wherein the at least one swelling element includes EPDM.

10. The hose connection in accordance with claim 1, wherein the at least one swelling element includes EPM.

11. The hose connection in accordance with claim 1, wherein the at least one swelling element is arranged in direct abutment with the hose.

12. The hose connection in accordance with claim 1, wherein the hose is pressed against the at least one swelling element.

13. The hose connection in accordance with claim 1, wherein the cross-section of the annular groove corresponds to that of the cross-section of the at least one swelling element.

14. The hose connection in accordance with claim 1, wherein the fitting comprises a sleeve that reaches around the hose, said sleeve being pressed together with the hose; wherein the sleeve has an inward-directed flange disposed at a first end of the sleeve that allows the sleeve to reach around a second annular rib of the nipple, and the sleeve includes an inward-directed rib at a second end of the sleeve that presses the hose against an extension of the nipple.

15. The hose connection in accordance with claim 14, wherein the fitting is secured to the connecting nipple.

16. The hose connection of claim 1, wherein the cross-section of the annular groove has at least one straight groove flank that terminates in a bottom of the annular groove having a semi-circular configuration.

17. A hose connection comprising:
a connecting nipple,
a hose attached to the connecting nipple, a first and second swelling element, each having a cross-section that is interposed between the connecting nipple and the hose and a volume that increases in or on contact with a fluid, and a fitting pressing at least a portion of the hose against the connecting nipple, a portion of the fitting protruding inwardly toward the hose adjacent the first swelling element, wherein the connecting nipple has an annular groove having a cross-section for the accommodation of at least one of the first and second swelling elements; the cross-section of at least one of the first and second swelling elements is equal to, or greater than, the cross-section of the annular groove; wherein the at least one of the first and second swelling elements is seated in the annular groove; and, after contact with said fluid, at least one of the first and second swelling elements swells to exert a pressure on the hose and deform the hose; and, wherein the connecting nipple includes an extension, and at least one of the first and second swelling elements is in contact with a dividing joint between the hose and the extension, the dividing joint including portions of the hose and the extension directly abutting each other.

* * * * *